(12) United States Patent
Bizjak et al.

(10) Patent No.: US 9,450,492 B1
(45) Date of Patent: Sep. 20, 2016

(54) SYSTEM AND METHOD FOR CONTROLLING A DUTY CYCLE OF A SWITCHED-MODE POWER SUPPLY

(71) Applicant: Infineon Technologies AG, Neubiberg (DE)

(72) Inventors: Luca Bizjak, Villach (AT); Emanuele Bodano, Villach (AT); Stefano Marsili, Faak am See (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/749,224

(22) Filed: Jun. 24, 2015

(51) Int. Cl.
  *H02M 3/156* (2006.01)
  *H02M 3/158* (2006.01)
  *H02M 3/157* (2006.01)
  *G05F 5/00* (2006.01)

(52) U.S. Cl.
  CPC .................................. *H02M 3/158* (2013.01)

(58) Field of Classification Search
  CPC ............ H02M 2001/0003; H02M 2001/0016; H02M 3/156; H02M 3/157; G05F 5/00
  See application file for complete search history.

(56) References Cited

U.S. PATENT DOCUMENTS 8,004,262 B2 * 8/2011 Saint-Pierre ........ H02M 1/4225
                                                                323/284

OTHER PUBLICATIONS

"High-Efficiency, Midrange-Input, Synchronous Buck Controller with Voltage Feed-Forward," TPS40077, Texas Instruments Inc., SLUS714—Jan. 2007—Revised Apr. 2009, 45 pgs.
"1.5A Step Down Switching Regulator," L4971, STMicroelectronics, May 2005, Rev. 11, 13 pgs.
"Dual, Multiphase Step-Down Voltage Mode DC/DC Controller with Accurate Current Sharing," LTC3861-1, Linear Technology, 2012, 38 pgs.

* cited by examiner

*Primary Examiner* — Gary L Laxton
(74) *Attorney, Agent, or Firm* — Slater Matsil, LLP

(57) ABSTRACT

In accordance with an embodiment, a method for controlling a switched-mode power supply (SMPS), includes receiving a measurement of a supply voltage input of the SMPS, determining a change in the supply voltage input over time based on receiving the measurement, comparing the determined change in the supply voltage input with a predetermined threshold value and applying a correction factor to an integrator within a feedback control loop of the SMPS based on the comparing.

26 Claims, 14 Drawing Sheets

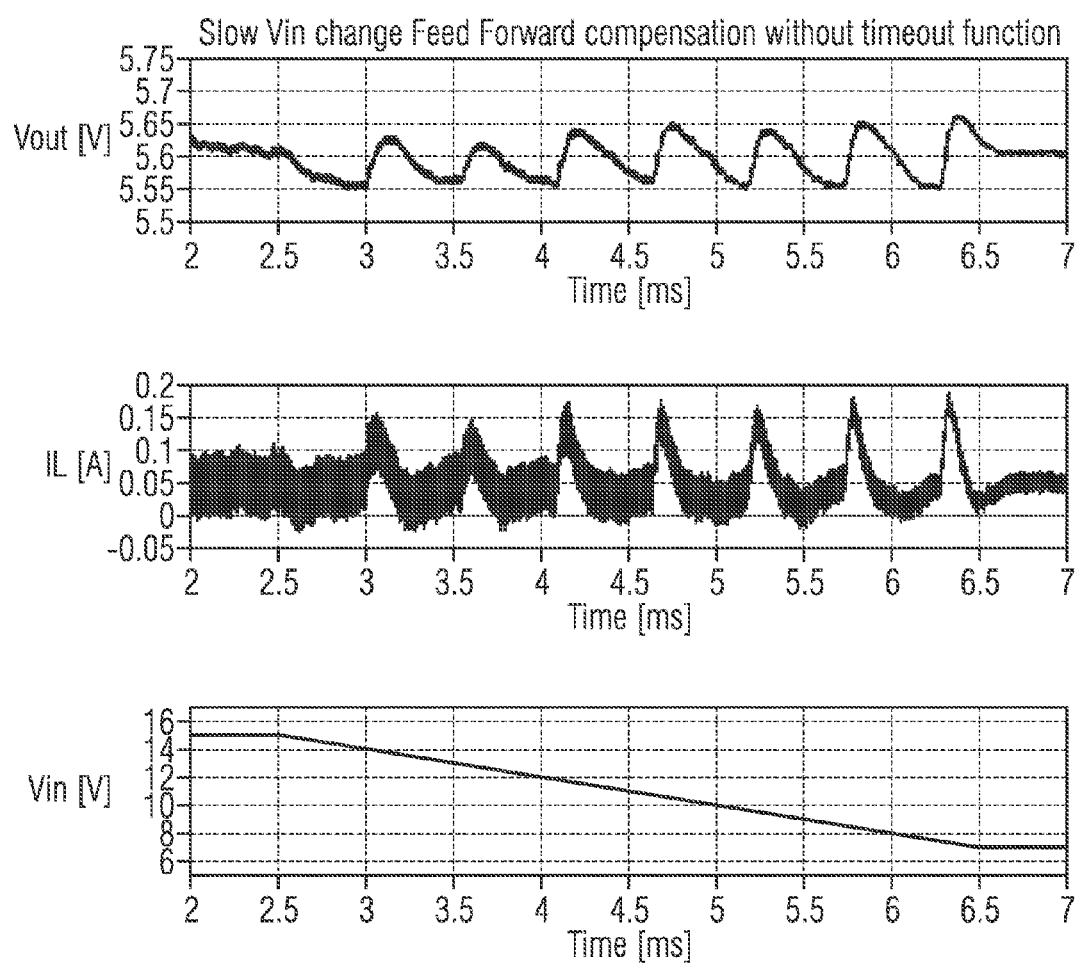

SYSTEM AND METHOD FOR CONTROLLING A DUTY CYCLE OF A SWITCHED-MODE POWER SUPPLY

CROSS-REFERENCE TO RELATED APPLICATIONS

This application relates to the following co-pending and commonly assigned patent applications: Ser. No. 14/749,170, filed on Jun. 24, 2015, which application is incorporated herein by reference in its entirety.

TECHNICAL FIELD

The present invention relates generally to an electronic device, and more particularly to a system and method for controlling a duty cycle of a switched-mode power supply system.

BACKGROUND

Switched-mode power supply (SMPS) systems are widely used in various electronic devices ranging from automobiles to cellular phones. A large number of these SMPS systems are powered by rechargeable and non-rechargeable batteries such as Alkaline, Lithium ion and Nickel Metal Hydride (NiMH). SPMS systems are designed to control the output for different loading conditions and exhibit good load regulation. These switching regulators are also designed to efficiently handle input supply voltage variation for short and long durations of time and provide a constant output.

Various electronic applications require SMPS systems to handle a wide range of operating conditions. These operating conditions may include a transient load condition and a line (battery) condition, a temperature variation, and a power saving mode. A digital or analog controller is used to provide static and dynamic responses over these different operating conditions. A digital or analog controller regulates the output by closing the feedback around the system. Proportional-integral-derivative (PID) controllers are often used in SMPS to handle responses to any output changes. In a PID controller, the proportional term is the error between the desired output state and the actual output. The derivative term is the change of proportional term over time, and a non-zero value indicates a rapidly changing system condition. The integral term is the accumulation of the proportional errors, and this term drives the control system to its final and stable value.

SUMMARY

In accordance with an embodiment, a method for controlling a switched-mode power supply (SMPS), includes receiving a measurement of a supply voltage input of the SMPS, determining a change in the supply voltage input over time based on receiving the measurement, comparing the determined change in the supply voltage input with a predetermined threshold value and applying a correction factor to an integrator within a feedback control loop of the SMPS based on the comparing.

BRIEF DESCRIPTION OF THE DRAWINGS

For a more complete understanding of the present invention, and the advantages thereof, reference is now made to the following descriptions taken in conjunction with the accompanying drawings, in which:

FIG. 9a and FIG. 9b illustrate waveform of various signals of a SMPS system with (FIG. 9b) and without (FIG. 9a) an embodiment feed forward controller;

Figure 1:
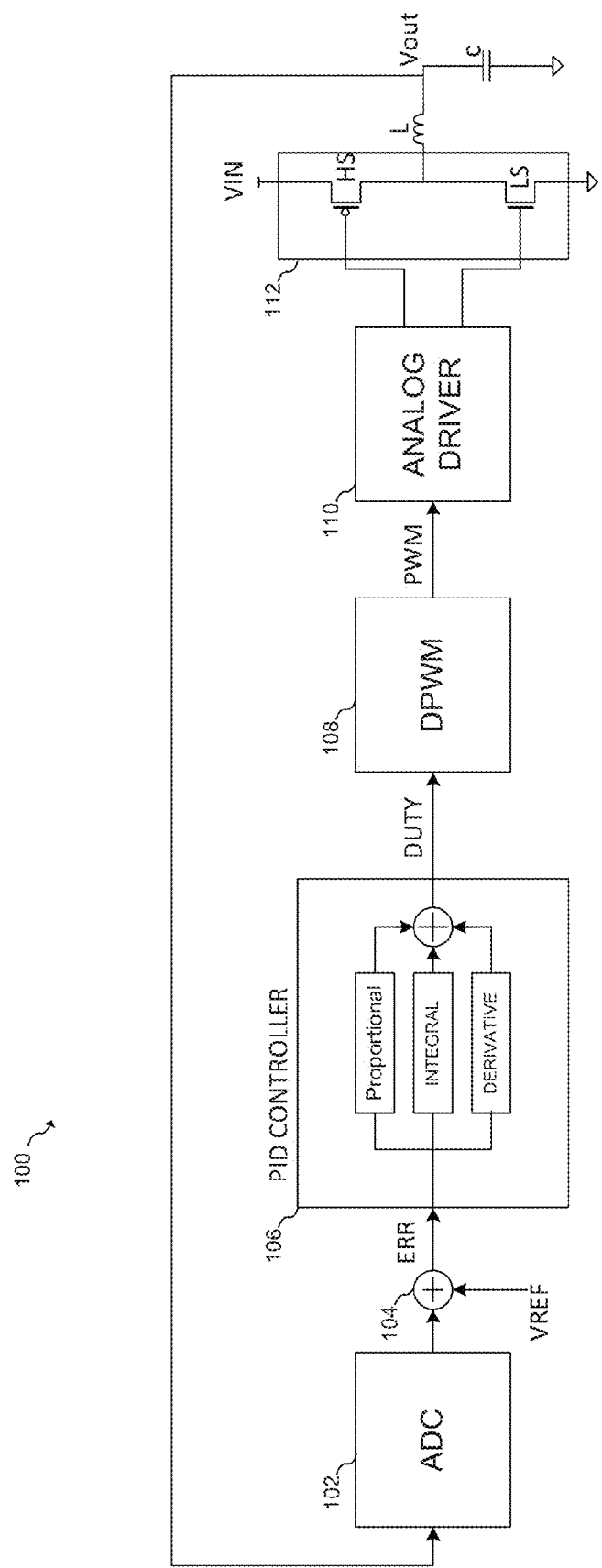
FIG. 1 illustrates an example switched-mode power supply (SMPS) system that includes a proportional-integral-derivative controller.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a system and method for controlling supply voltage input variation by a feed forward controller in a switched-mode power supply (SMPS) system. Embodiments of the present invention may also be applied to various systems that utilize feed forward control, such as DC-DC converters, motor control and other control systems.

A SMPS output voltage may be affected by the variation of its supply voltage input. Furthermore, a drift in the supply voltage input of the SMPS while it is in a low power mode, such as pulse frequency modulation (PFM) mode, may result in a transient response when the SMPS transitions to a pulse width modulation (PWM) mode. An embodiment power supply controller uses a feed forward technique to adjust the supply voltage drift by updating a correction factor to an integrator of a proportional integral derivative controller (PID). In an embodiment of the present invention, a controller circuit is configured to calculate a variation of a supply voltage input Vin of a SMPS. This is done by taking a measurement of the supply voltage input and comparing it with a previously measured value and generating a difference. This difference is compared with a predetermined threshold range to identify if the value has crossed the threshold range. When the difference value crosses the threshold, a correction based on the supply voltage input is applied by a feed forward controller to an integrator of a PID controller. The control loop responds by adjusting the duty cycle accordingly. The integrator of the controller applies the adjusted duty cycle of the PWM driving signal for the SMPS. The duty cycle is adjusted based on a calculated on time Ton over a total period T of the PWM driving signal. In another embodiment the duty cycle is adjusted based on a calculated off time Toff value.

In an embodiment, a feed forward controller in the control loop is designed to handle any supply voltage input Vin drift during a mode transition between the PFM and the PWM mode. As the mode transition is initiated, a feed forward control circuit calculates an initial duty cycle based on the actual supply voltage input Vin before transition. In some embodiments, a value corresponding to this initial duty cycle is loaded into the integrator just prior to the mode transition. The initialized value of the duty cycle mitigates the effects of transients during the transition from the PFM to the PWM mode. The initialized duty cycle may also take care of any supply voltage input drift that may occur during the PFM mode.

FIG. 1 illustrates an exemplary SMPS system 100 that includes a PID controller 106, an analog to digital converter (ADC) 102, a summing junction 104, a digital pulse width modulation (DPWM) block 108, an analog driver 110, and a half-H bridge switch driver 112. During operation, the analog driver 110 periodically switches a high side transistor HS and a low side transistor LS to control the current through the inductor L and an output capacitor C. The analog driver 110 is controlled by the DPWM 108 that generates a PWM signal to control the amount of time the high side driver is turned on or turned off. Voltage Vout increases when high side transistor HS is on and the output capacitor C is charged via the inductor L. Capacitor C is also charged when a low side driver LS is on and a positive current flows through the inductor L into the capacitor C. The output of the ADC 102 is compared with the reference voltage VREF to estimate an error value ERR and the PID controller 106 uses this error value ERR to adjust the duty cycle. The adjusted duty cycle DUTY is fed to DPWM 108 to generate an equivalent PWM signal to the analog driver 110. The duty cycle is increased or decreased based on the value and sign of the error generated by summing junction 104.

Figure 2:
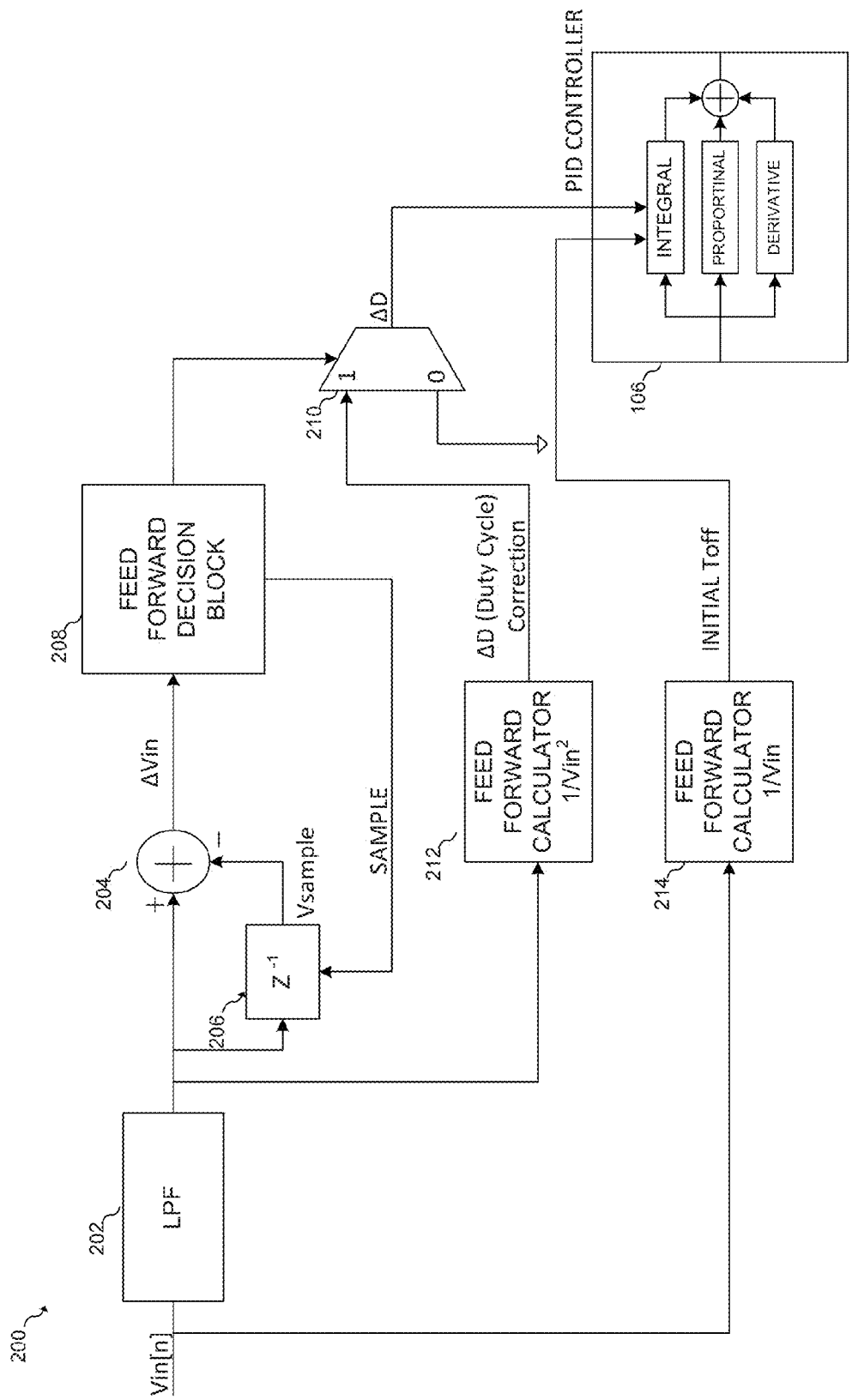
FIG. 2 illustrates a SMPS system that includes an embodiment feed forward controller.

FIG. 2 illustrates an embodiment feedback control loop 200 of a SMPS that includes a first feed forward calculator 212 to adjust a supply voltage input variation during a PWM mode operation, a second feed forward calculator 214 used to adjust for supply voltage input drift during mode transition between the PFM mode and the PWM mode. The embodiment feedback control loop 200 further includes a feed forward decision block 208 to determine when to apply correction, a multiplexer (MUX) 210 to select a correction to send to a PID controller 106, and a low pass filter (LPF) 202 coupled to a summing circuit 204. The summing circuit 204 compares a present measurement value of Vin with a previously measured Vsample stored in a memory element 206 to generate a difference value ΔVin. The difference value ΔVin is calculated by the memory element 206 at each switching cycle of the SMPS. The feed forward decision block 208 uses the difference value ΔVin to determine whether to provide an update to the integrator by generating a control signal for the MUX 210. The feed forward decision block 208 compares ΔVin to a predetermined threshold value and decides to provide an update when ΔVin crosses the threshold. Alternatively, if the Vin variation is slow and stays within the threshold for a long time, an update to the integrator occurs when the difference value ΔVin exceeds the predetermined threshold. This causes output voltage ripple due to the correction update provided to the integrator each time the ΔVin exceeds the threshold. In order to avoid such ripple, a time out function is used to force an update to the memory element 206 by controlling a signal called SAMPLE coupled to the memory element 206. The decision block 208 updates the accumulator 418 when the difference value ΔVin exceeds the predetermined threshold. When activated, the signal SAMPLE causes a difference measurement between a present and a previous measurement and stores the present measurement to the memory element 206. In another embodiment the difference value ΔVin is calculated only when the predetermined threshold value of the feed forward decision block 208 is crossed or the timeout functionality expires.

An unfiltered Vin measurement Vin[n] also goes to second feed forward calculator 214 that is responsible for generating an initial duty cycle value INITIAL Ton or INITIAL Toff. The generated initial duty cycle value is applied directly to the integrator of PID controller 106 of SMPS system 100. During operation, the output of the LPF 202 is also supplied to a feed forward calculator 212 that generates a correction value for duty cycle represented by ΔD. This correction is applied to an integrator of the PID controller 106 used in the SMPS via the MUX 210. In some embodiments, feed forward calculator 212 calculates a value that is inversely proportional to the square of the input voltage $Vin^2$. Feed forward calculator 212 may be implemented using various circuits and systems known in the art. For example, a look up table (LUT) may be used to calculate a value that is inversely proportional to $Vin^2$. Alternatively, a processor, a micro-controller or another circuit may be used to determine this value.

An oversampling OS factor is a value that represents the switching period as a multiple of a digital clock period. It is given by the equations:

$$OS = Tsw/Tck \qquad (1),$$

$$OS = fck/fsw \qquad (2),$$

where Tsw is the switching period, Tck is the digital clock period, fsw is the corresponding switching frequency and fck is the corresponding digital clock frequency. The feed forward calculator 212 may compute this value or a value proportional to this number. The supply voltage input measurement from the LPF 202 is used by the summing circuit 204 that compares it with a previously measured value and generates a difference value ΔVin. The ΔVin is an indication of Vin variation at a given time and it is compared to a threshold value in the feed forward decision block 208. If ΔVin crosses the threshold then the feed forward decision block 208 selects a duty cycle correction from the MUX 210 to be applied to the integrator of the PID controller 106 of the SMPS. The crossing of the threshold also activates the signal called SAMPLE, which activates the memory element to store the present measurement of supply input voltage. The signal sample is also activated when a predetermined time has elapsed without ΔVin crossing the threshold value. A slow supply voltage input variation may cause a ripple in the output voltage if the feed forward algorithm is allowed to provide an adjustment only when the ΔVin crosses the threshold value. The present embodiment provides a correction for the slow variation of the power supply and mitigates the ripple in the output voltage by allowing the memory element 206 to be updated with a sampled input voltage after a predetermined time using a time out function. In some embodiments, the predetermined time is a value that is similar to the system bandwidth of the SMPS.

As shown in FIG. 2, the feed forward control circuit provides another correction for Vin variation via feed forward calculator 214. The feed forward calculator 214 provides a correction factor that is inversely proportional to Vin. A look up table is used to generate a value proportional to 1/Vin and that value is further multiplied with the output voltage Vout and the oversampling OS factor. The correction factor is used to initialize the integrator of the PID controller 106. The correction is provided when SMPS transitions from a PFM mode to a PWM mode in order to adjust for Vin variation that occurs during the PFM mode. Adjusting for such variation mitigates the effect of output voltage transients during mode transitions.

Figure 3:
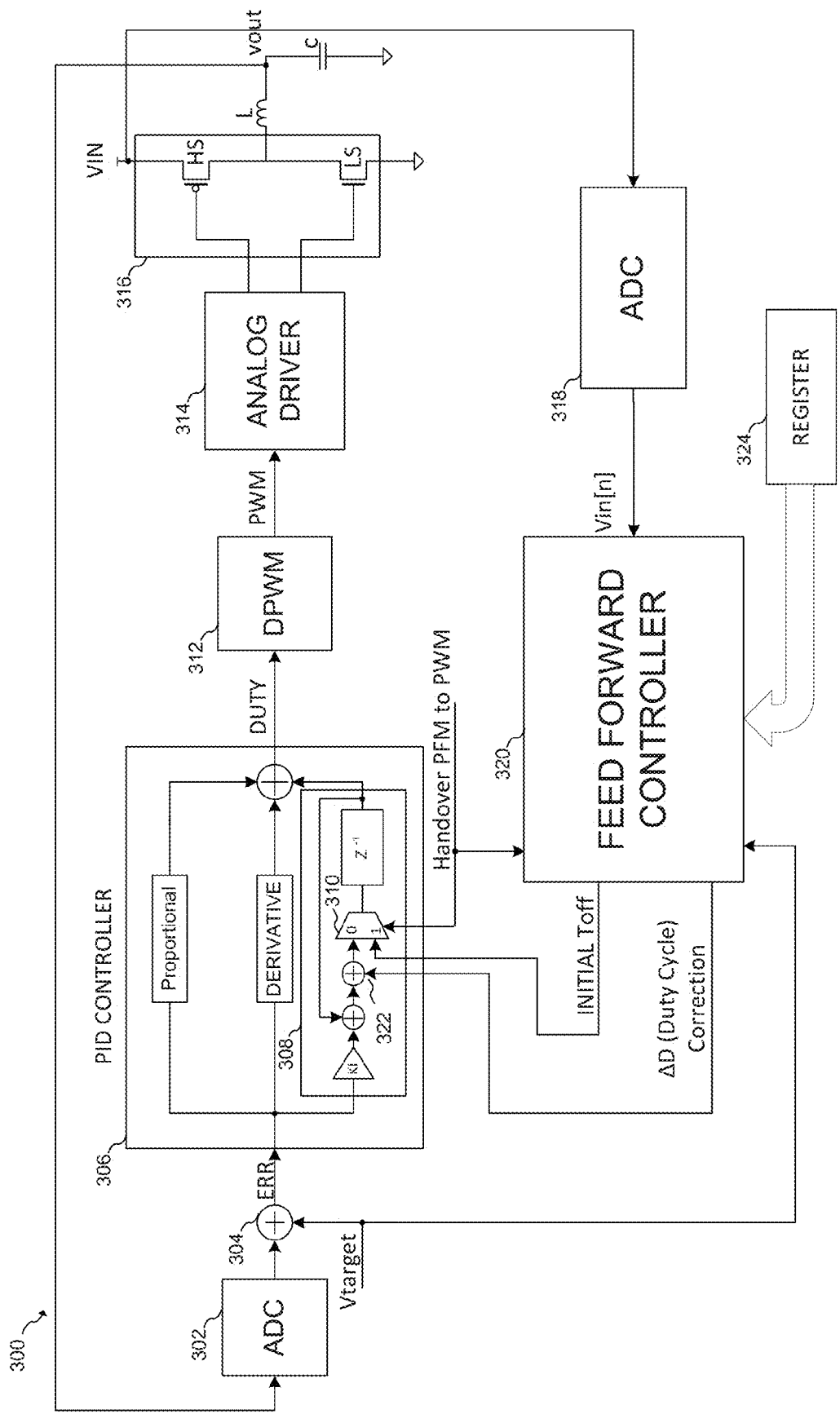
FIG. 3 illustrates another embodiment feed forward controller in a SMPS system.

FIG. 3 illustrates an embodiment feed forward controller 320, in a SMPS system 300, that includes a PID controller 306, and an ADC 318 to provide a feedback for the supply voltage input Vin. The feed forward controller 320 receives a measurement value of the supply voltage input Vin via the ADC 318. The feed forward controller 320 computes a difference ΔVin between a present measurement and a previous measurement stored in a memory element. ΔVin is compared with a predetermined threshold value, and if ΔVin crosses the threshold value, then the feed forward controller applies a feed forward correction to the integrator 308 of the PID controller 306. The integrator then produces an adjustment to the duty cycle as a time $t_{on}$ or $t_{off}$ in a digital pulse width modulation (DPWM) block 312 depending on the particular implementation. The integrator 308 inside the PID controller 306 includes a summing junction 322, where a feed forward value of duty cycle correction ΔD is provided. A counter also initiates a ΔVin measurement when a fixed time period has elapsed without ΔVin crossing the threshold value. The integrator 308 is configured to accept a feed forward correction for a duty cycle during a mode transition via a multiplexer (MUX) 310. The SMPS system 300 regulates an output voltage Vout using another ADC 302, a summer 304 and the PID controller 306. The summer 304 provides an error value based on a feedback value of the Vout via ADC 302 and a target value Vtarget representing a value of an actual output voltage of the SMPS. In an embodiment, a set of registers 324 may be used by the feed forward controller 320 to access various design parameter values.

In order to save power, a SMPS is operated in a PFM mode during low load condition. In the PFM mode, the SMPS may be switched at a constant duty cycle with a varying switching frequency to regulate an output voltage. In a low load current application, the PFM mode provides efficient voltage regulation. A PWM mode is another way to control the output voltage and is widely used under heavy current load condition. During the PWM mode, the switching frequency is fixed and the duty cycle is modulated to regulate the output voltage. In an embodiment, the feed forward controller 320, when transitioning from the PFM mode to the PWM mode, generates an on time $t_{on}$ or off time $t_{off}$ that is used to compute a duty cycle based on the input supply voltage. The integrator is initialized with this value before the mode transition takes place and is referred to as an initial duty cycle. A control signal called handover PFM to PWM controls the mux 310 to select the value for initial time on $t_{on}$ or time off $t_{off}$ from feed forward controller 320. A power supply input transient may cause over or under voltage or overcurrent and affect the dynamic performance of a SMPS. In the present embodiment, such performance is improved by initializing the integrator with a duty cycle proportional to the supply voltage before the transition. The adaptive control of the duty cycle handles any drift of the power supply input that may occur while the SMPS is in the PFM mode.

Figure 4:
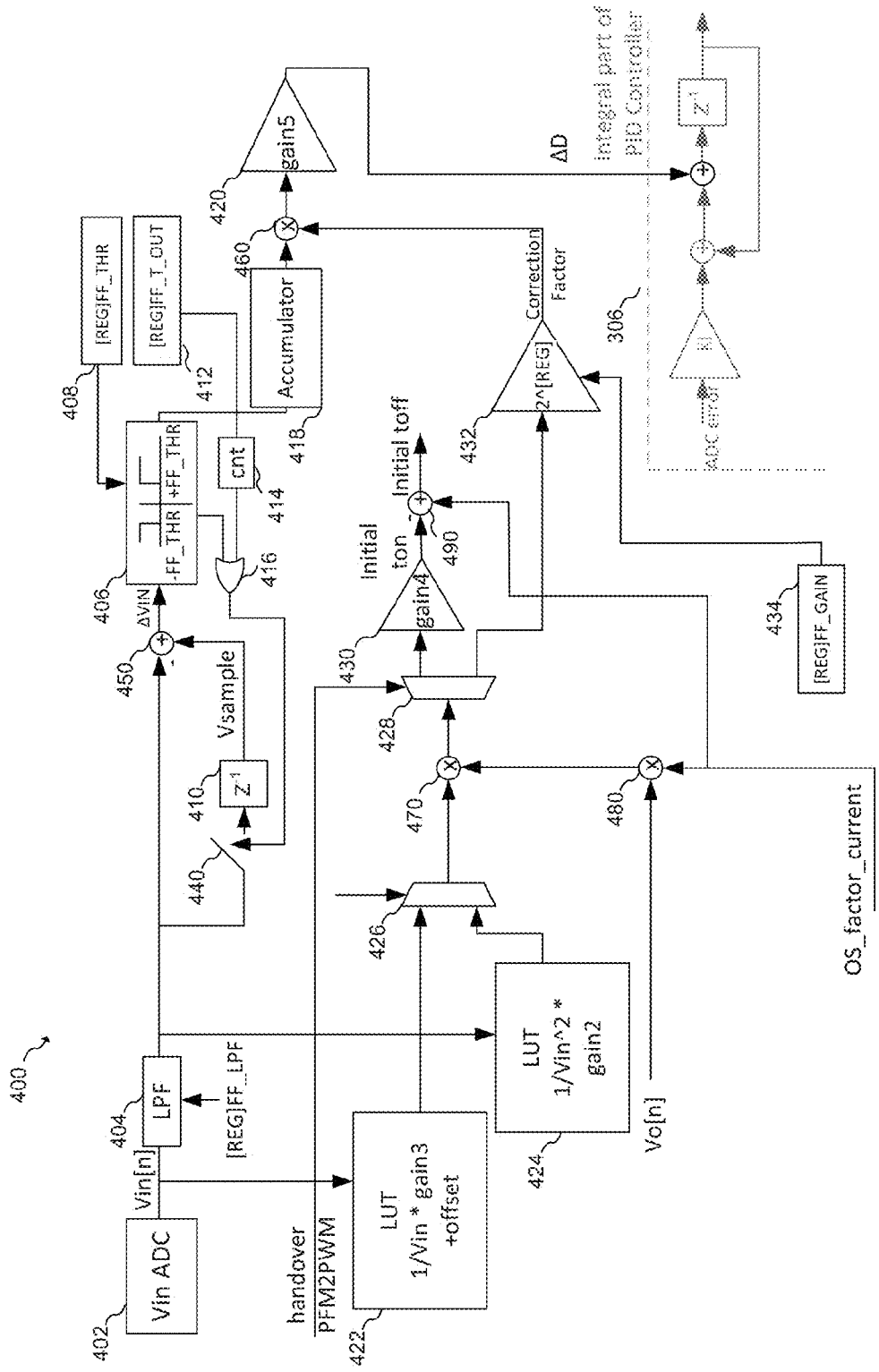
FIG. 4 illustrates another embodiment feed forward controller in a SMPS system.

FIG. 4 shows a feed forward controller 400 according to an embodiment of the present invention. The feed forward controller 400 includes an ADC 402 that is coupled to a LPF 404. The LPF 404 may be implemented by averaging the digital measurements of input over a specific period of time. In another application, it may be implemented by using a complex method of moving averages of digital samples. The output of the LPF 404 is coupled to a difference circuit represented by a memory element 410, summer 450 and switch 440. The memory element 410 and the summer 450 are configured to measure a difference between a present measurement value and a previous measurement value of the supply voltage input received from LPF 404.

A threshold comparator circuit 406 is used in the feed forward controller 400 to compare the difference of the supply voltage input measured by the summer 450 to a predetermined threshold values set by +FF_THR and −FF_THR. When the difference crosses the threshold levels, the output of the threshold comparator circuit 406 is asserted and it enables the memory element 410 to update its stored value with a latest filtered value of supply voltage input sampled by the ADC 402. A control signal from the counter 414 also enables the memory element to update its stored value with a new measurement of the supply voltage input. The control signal from the counter 414 is asserted every time the counter counts to a count value FF_T_OUT. The counter 414 gets reset each time the threshold comparator 406 is asserted or when the counter 414 times out by counting to a count value FF_T_OUT.

As shown in FIG. 4, the threshold comparator circuit 406 is coupled to the output of the summer 450 to compare the difference of the supply voltage input with the predetermined threshold values stored in a register 408. A control signal from the threshold comparator circuit 406 is coupled to a logic OR gate 416 responsible for activating a switch 440 that allows the sampled supply voltage input to be stored in the memory element 410. The summer 450 measures the difference between a stored value of supply voltage input from the memory element 410 and a filtered supply voltage input measured by the ADC 402. If the difference crosses the threshold value, the control signal from threshold comparator circuit 406 sets the output of the logic OR gate 416 to enable the memory element 410 to store new value of supply voltage input. The output of the time out counter 414 connected to the input of the logic OR gate 416 initiates a new update to the memory element 410 when the counter 414 reaches the count value FF_T_OUT set in a register 412. The time out of the counter 414 is used to force the memory element 410 to sample a new value of the supply input voltage. In an embodiment, the sampling of the memory element 410 may also include a comparison of the difference value between the difference in supply input voltage measured by the summer 450 to the threshold values +FF_THR and −FF_THR.

As shown in FIG. 4, the accumulator 418 is coupled to the output of the threshold comparator circuit 406. The accumulator 418 is updated with a non-zero value when the difference measurement crosses the threshold values. A non-zero accumulator value initiates a correction factor to be applied to the integrator of the PID controller used in the control loop. The application of the correction value continues until accumulator 418 reaches a zero value. In an embodiment, if the accumulator value stored is N, then the correction is applied for N switching cycles. A multiplier 460 coupled to the output of the accumulator 418 is used to add or subtract the correction value to the integrator for a number of times equal to the value of the accumulator 418.

The value of the correction factor for Vin variation in PWM mode is computed by indexing a look up table (LUT) 424 for a value proportional to $1/Vin^2$ from a filtered Vin measurement and multiplying that value by an output voltage Vo[n] and an oversampling OS factor. In other embodiments, the LUT 424 may be replaced by a micro-controller or a digital signal processor (DSP) to compute the value proportional to $1/Vin^2$. A multiplexer 426 selects the output of the LUT 424 based on a control signal called handover PFM2PWM. The signal handover PFM to PWM provides an indication when a mode transition between the PFM mode to the PWM mode is requested. Another multiplier 470, coupled to the output of the multiplexer 426 is used to multiply the LUT 424 value to the output voltage Vo[n] and the OS factor. The OS factor is a reset value of a digital counter configured to generate the PWM signal as shown in DPWM 312 in the SMPS system 300. The correction factor is further gained in a gain stage 432 that uses a gain value stored in a register 434. The output of the gain stage 432 is used by the multiplier 460 to generate the correction if the accumulator 418 value is not equal to zero. In this case the accumulator is decremented by a factor set by the gain used in the gain stage 432. The output of the multiplier 460 is further gained by another gain stage 420, and the output is provided to an integrator of the PID controller 340 of the SMPS system 300.

In an embodiment of the present invention, the feed forward controller 400 provides an initial duty cycle inversely proportional to voltage input Vin variation when transitioning from the PFM mode to the PWM mode. The initial duty cycle is applied to the integrator of the controller to adjust for any Vin drift that may occur while in PFM mode. The multiplexer 426 is used to select a value proportional to the inverse of Vin computed in a LUT 422 controlled by the control signal handover PFM2PWM. During a transition from PFM to PWM, the control signal selects the LUT 422 value to the output of the multiplexer 426 and after it is multiplied by the output voltage Vo[n] and the OS factor in multiplier 470. This multiplied value is brought out of de-multiplexer 428 and passed through a gain stage 430 to scale down the value from the LUT 422. Another multiplier 480 is used to multiply the output voltage Vo[n] and OS factor and the product is used in the multiplier 470. The output of the gain stage 430 provides an initial duty cycle and a time off value Initial $t_{off}$ is calculated when this value is subtracted from the OS factor using the summer 490. The Initial $t_{on}$ or $t_{off}$ value may be used to calculate the duty cycle that is used by the controller when in PWM mode. The initial duty cycle handles any overshoot or undershoot of the output voltage by allowing the loop to compensate for supply voltage input variation. It is to be noted that the multiplier 470 is used to calculate the initial value of the integrator by calculating the initial on time $t_{on}$ or initial off time $t_{off}$ using the de-multiplexer 428 and the gain stage 430. The multiplier 470 is re-used to calculate the correction factor to the integrator via de-multiplexer 428 and gain stage 432.

The correction factor for the duty cycle is calculated by using the relationship between the duty cycle D and an output voltage Vout for a step down buck regulator which is given by the equation:

$$D = \frac{Vout}{Vin}, \quad (3)$$

where Vin is the input voltage. The variation of the duty cycle is related to the variation of the input voltage by $$\frac{\Delta D}{\Delta Vin} = -\frac{Vout}{Vin^2} \quad (4)$$

$$\Delta D = -\frac{Vout * \Delta Vin}{Vin^2}, \quad (5)$$

where $\Delta D$ is the variation of the duty cycle and $\Delta Vin$ is the variation of the input voltage. These equations provide a look-ahead value by which the integrator value of the PID controller is corrected. The duty cycle can be corrected by measuring the Vin variation and having knowledge of the target output voltage Vout.

In the embodiment of the present invention, two signal paths are used to handle Vin variation in two different situations. The first signal path handles Vin variation during PWM mode, and the second path handles Vin variation during transition between two different modes of operation such as PFM mode and PWM mode. During PFM mode, output voltage is controlled by energizing the inductor when the output voltage falls below a predetermined threshold and remains idle for the rest of the time. It is done by varying the switching frequency with a fixed duty cycle. An SMPS is operated in PFM mode under a low load condition. The PWM mode of operation involves switching the SMPS at a fixed switching frequency but with variable duty cycle. The SMPS is operated in PWM mode under a high load condition.

The $\Delta Vin$ during PWM mode is calculated by a differentiation function utilizing a memory element representing the function $Z^{-1}$. The value in the memory element is used to calculate a difference between a present value and a previously measured value of the supply voltage input represented by $\Delta Vin$. The measurement takes place every switching cycle of the SMPS. A timeout function is also included during the detection of the Vin variation. The timeout function ensures that the update of the correction based on the calculation of the difference of the supply voltage input is refreshed at a certain rate that is comparable to the system bandwidth. Any variation in Vin that is slower than the system bandwidth introduces a larger ripple at the output when Vin is corrected only when its variation exceeds the threshold. In order to mitigate this problem, a timeout function is implemented to control the refresh rate of the delay element at a rate that is comparable to the system bandwidth.

In an embodiment, the difference between a present value and a previous value of the supply voltage is passed through an amplitude band pass digital filter to determine whether the absolute value of the deviation is bigger than a predetermined threshold value. If the value is bigger, then it is added to an accumulator and a correction factor is applied to the integrator as long as the accumulator holds a non-zero value. The number of corrections to the integrator continues for the number of cycles equal to a value stored in the accumulator. The correction factor is computed by using a look up table to generate an equivalent value proportional to inverse of $Vin^2$. This value is multiplied with an output target value Vo[n] and an OS factor described above.

The loop also handles Vin variation during the transition from the PFM mode to the PWM mode. When a mode transition is initiated, the feed forward control loop generates a correction value by using the digitized ADC along with a look up table LUT to calculate 1/Vin. The algorithm adds a gain factor and an offset factor to this calculated value. The gain factor provides the use of increased resolution to make use of the full range of the look up table LUT and the offset factor is used to adjust the digital calculation of an initial duty cycle for mitigating any overshoot or undershoot. This value is then multiplied with output voltage Vo[n] and a counter reset value (OS) of the digital pulse width modulation (DPWM). This value when scaled back by the gain value is used to generate an initial duty cycle that is used when SMPS transitions from the PFM mode to the PWM mode.

Figure 5:
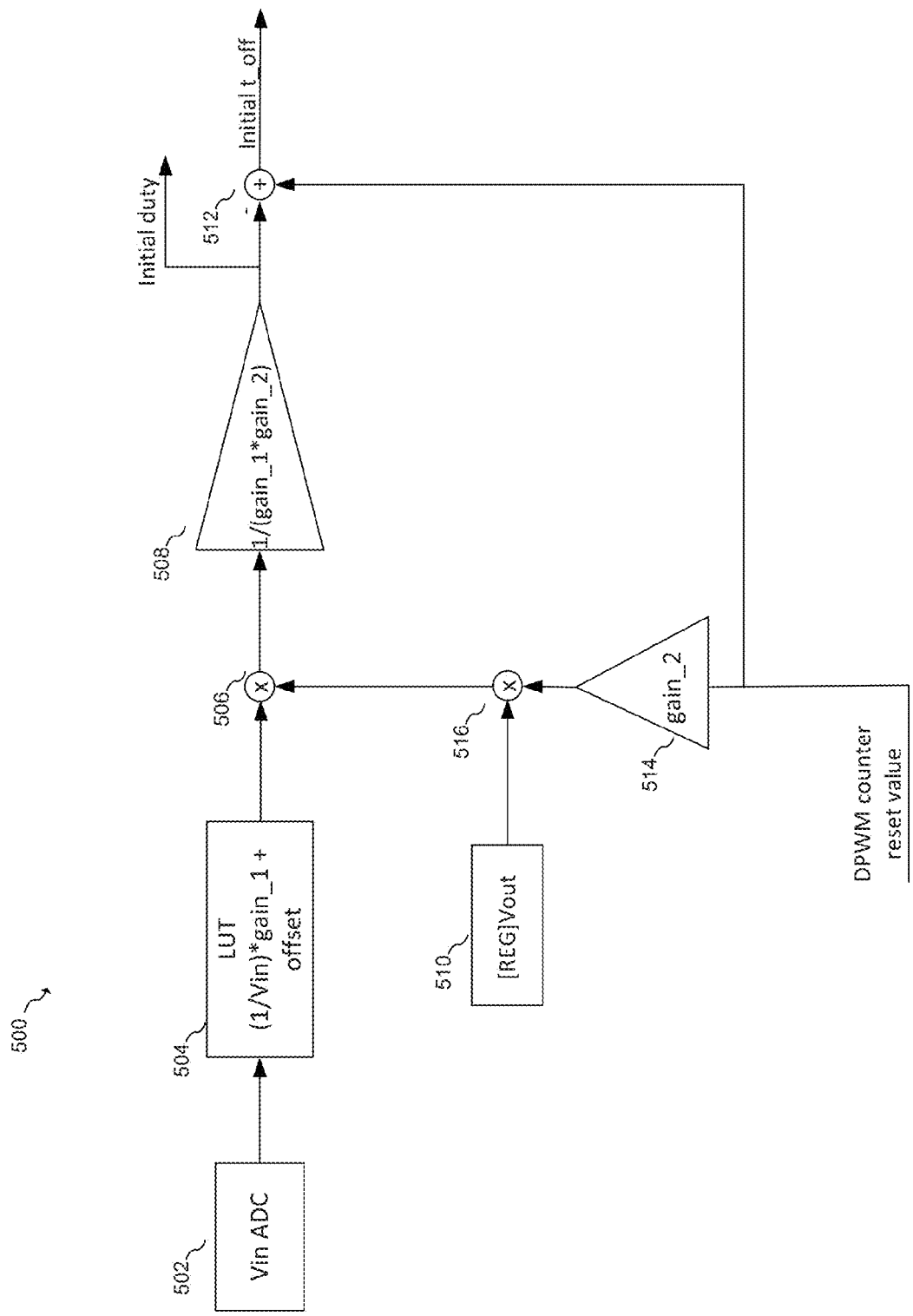
FIG. 5 illustrates another embodiment feed forward controller in a SMPS system.

FIG. 5 illustrates another embodiment of a feed forward controller system 500 that includes an analog to digital converter (ADC) 502 configured to measure a supply voltage input Vin, a look up table (LUT) 504 coupled to the output of the ADC 502, a first multiplier 506 multiplying the value generated by the LUT 504 and an output of a second multiplier 516. The feed forward controller system 500 also includes a first gain stage 508 configured to gain the first multiplier 506 output and generate an initial duty cycle. A second gain stage 514 is used to scale a counter reset value of a digital pulse width modulation (DPWM) 108, as described with respect to SMPS system 100, and apply the gained value to the second multiplier 516, where it is multiplied by an output voltage value Vo[n] stored in a register 510. The result of the second multiplier 516 is used in the first multiplier 506. The output of the first multiplier 506 provides the initial duty cycle when it is scaled by the first gain stage 508. A summing circuit 512 is used to subtract the initial duty cycle from the counter reset value of DPWM to generate an on time $t_{on}$ or off time $t_{off}$. Summing circuit 512 may be implemented using summing circuits and/or subtraction circuits known in the art. This value is used to initialize the integrator of the PID controller to eliminate any over/undershoot or overcurrent condition that may occur while transitioning from the PFM mode to the PWM mode of operation.

Figure 6:
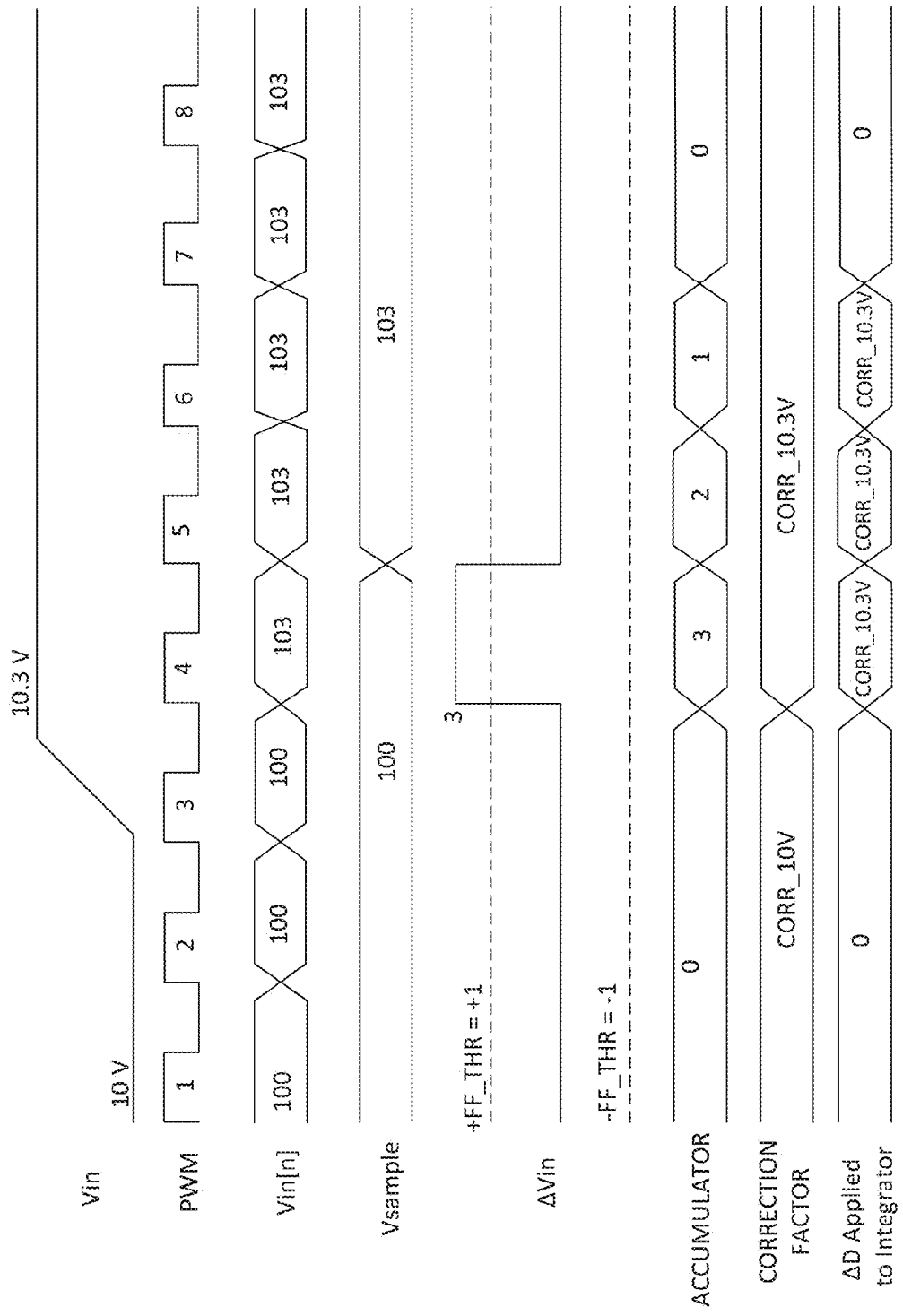
FIG. 6 illustrates a waveform diagram associated with an embodiment of feed forward controller.

FIG. 6 illustrates a waveform diagram of various signals within a feed forward controller of a SMPS system 300 that represents the response of the system to a fast change in Vin. The horizontal axis shows the timing information and the vertical axis shows the voltage information. The waveform labeled Vin corresponds to the supply voltage input, the waveform labeled PWM shows a pulse width modulated signal used by the analog driver 314. The signals labeled Vin[n] and Vin [n−1] represent a present and a previously measured digitized value of supply voltage input respectively. The signal labeled ΔVin represents a difference value of the present and the previously measured supply voltage input. The signal labeled ACCUMULATOR indicates an accumulator value, the signal labeled CORRECTION FACTOR is another digital value calculated by the feed forward controller 320 based on the supply voltage input, and the signal labeled ΔD applied to integrator is the duty cycle correction applied to the integrator.

The waveform shows a feed forward correction is applied when the input supply voltage changes more than the threshold level. As shown in the FIG. 6, the supply voltage input Vin goes from 10 V to 10.3 V shortly after the third PWM signal. The digitized value for Vin[n] is 100 until the fourth PWM and the Vin[n] is changed to the new value of 103. The value of Vsample is updated when the difference value ΔVin exceeds the threshold value of ±1. The ΔVin shows a difference of 3 between the present and the previous measurements, which crosses the threshold value of FF_THR±1. The crossing of the threshold updates the previously measured Vsample to assume the value of 103 in the next PWM cycle. This also updates the accumulator with the difference and is decremented until it is zero. The correction factor for a supply input voltage of 10.3 V is calculated and it is applied to the integrator until the accumulator values reaches zero. The waveform shows that after three cycles the ΔD applied to the integrator goes to zero as ΔVin is zero and no threshold crossing is observed. The waveform diagram in FIG. 6 depicts one of many examples of the performance of embodiment system.

Figure 7:
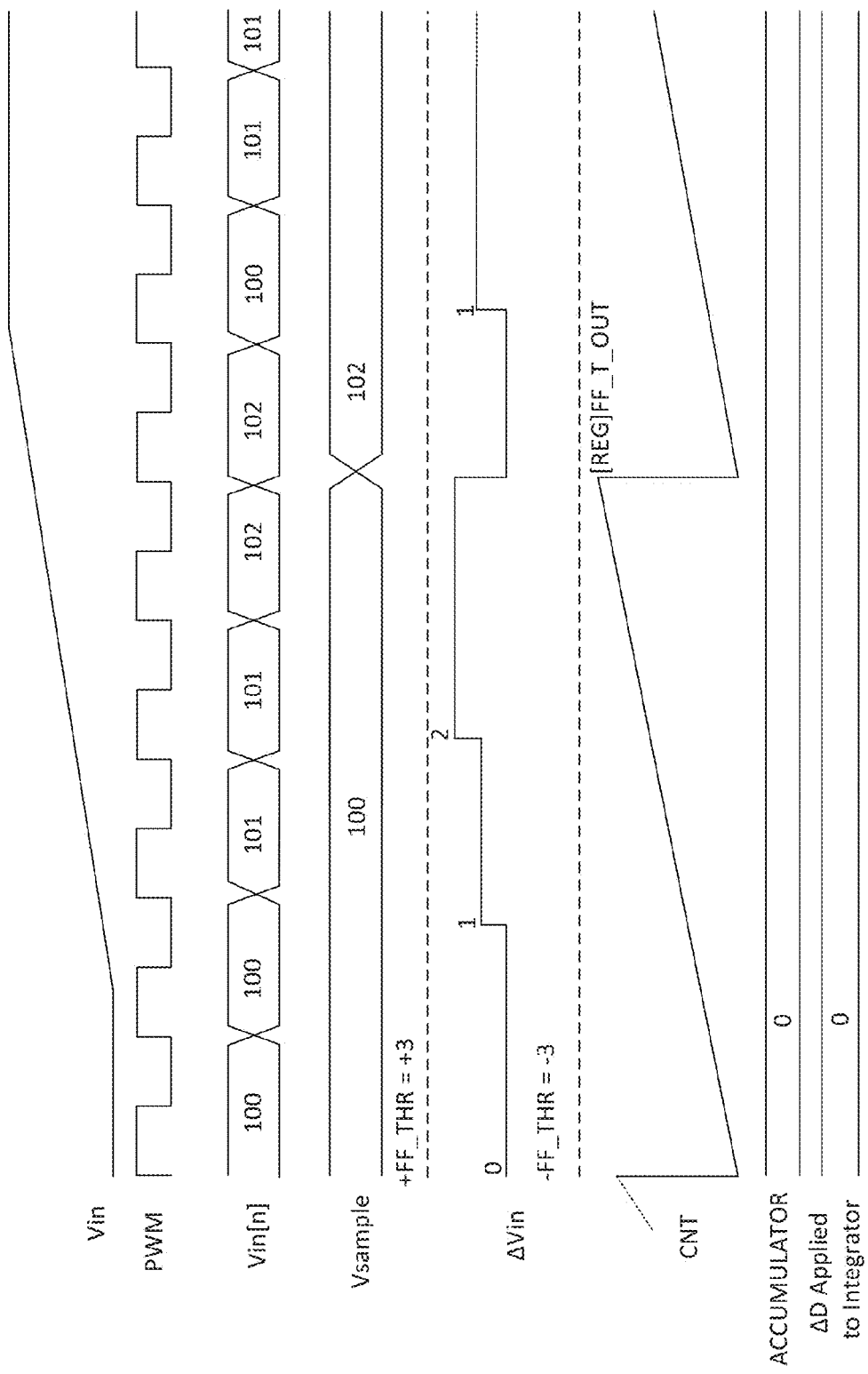
FIG. 7 illustrates a waveform diagram associated with another embodiment of a feed forward controller.

FIG. 7 illustrates a waveform diagram for a feed forward controller of the SMPS system 300 that represents the response of the system to a slower change in Vin, where the supply voltage input does not cross the threshold for a fixed time period set by a counter value stored in a register [REG]FF_T_OUT. In FIG. 7, a waveform labeled CNT is added to the previous waveforms shown in FIG. 6. FIG. 7 shows a slow rise in Vin voltage and the change is within the threshold value of FF_THR_±3. The ΔVin increases to a value of 1 and then a value of 2 that is shown in the measurements of Vin[n] as 101 and 102 respectively. However, the difference does not cross the threshold value of ±3 and accordingly, the accumulator value is not updated. The duty cycle correction ΔD also remains zero as ΔVin does not cross the threshold value. The CNT waveform shows the counter ends counting when it reaches the count value of FF_T_OUT and at this time the value of Vsample is updated with the present measured value of 102. The waveforms show that during a time period when ΔVin does not cross the threshold the counter provides a refresh of the Vsample at the end of the count.

Figure 8:
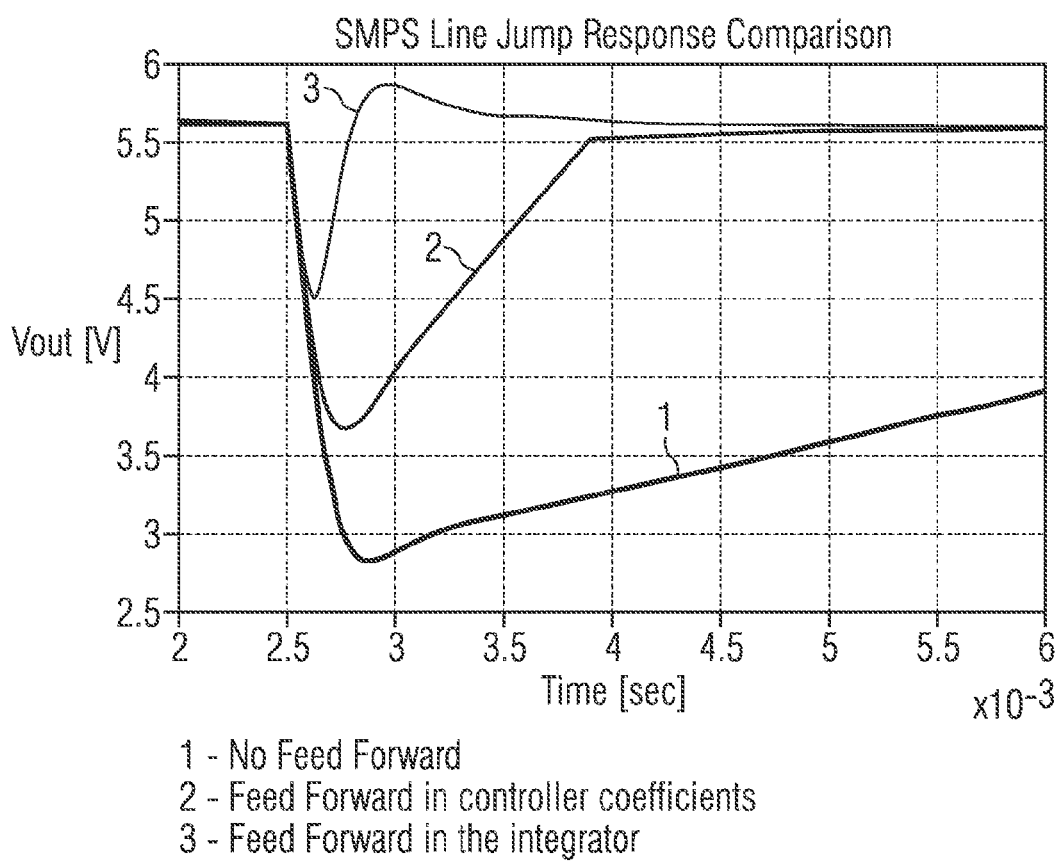
FIG. 8 illustrates a waveform of output voltage of a SMPS system using different feed forward controllers.

FIG. 8 shows a waveform diagram of an output voltage in a simulated response of a SMPS using three different feed forward controls. The waveforms show how output voltages respond to a jump of the supply voltage input from 15 V to 7 V. The output voltage labeled 1 is a response of a SMPS without any feed forward control. The waveform shows a sharp decrease in the output voltage to a value near 2.7 V and then the recovery slope is very slow to go back to the target voltage. The waveform labeled 2 is a response of the SMPS where the feed forward controller is implemented by modifying the controller coefficients. The waveform 2 shows a sharp decrease to around 3.6 V and goes back to the output voltage in around 1 millisecond of time. The waveform labeled 3 is the response of a SMPS using the present embodiment. The waveform shows a sharp decrease to around 4.5 V and goes to back to the target output voltage within less than half the time taken by waveform 2. The present embodiment shows lower voltage decay and the fastest recovery time.

FIG. 9a shows a waveform diagram of various signals in a SMPS responding to a slow supply voltage input variation without using a timeout function. The waveform labeled Vout is the output voltage, the waveform labeled Vin is the supply voltage input, and the waveform labeled IL is the inductor current of the SMPS. The input voltage Vin slowly decays from 15 V to 6.5 V in approximately 4 milliseconds. The slow decay of the input supply voltage causes a ripple at the output voltage Vout between 5.55 V and 5.65 V because the controller overcompensates for drift in input voltage Vin. The slow variation of the supply voltage input causes a ripple in the output because the feed forward path is active and causes the loop to be overcompensated.

Figure 9B:
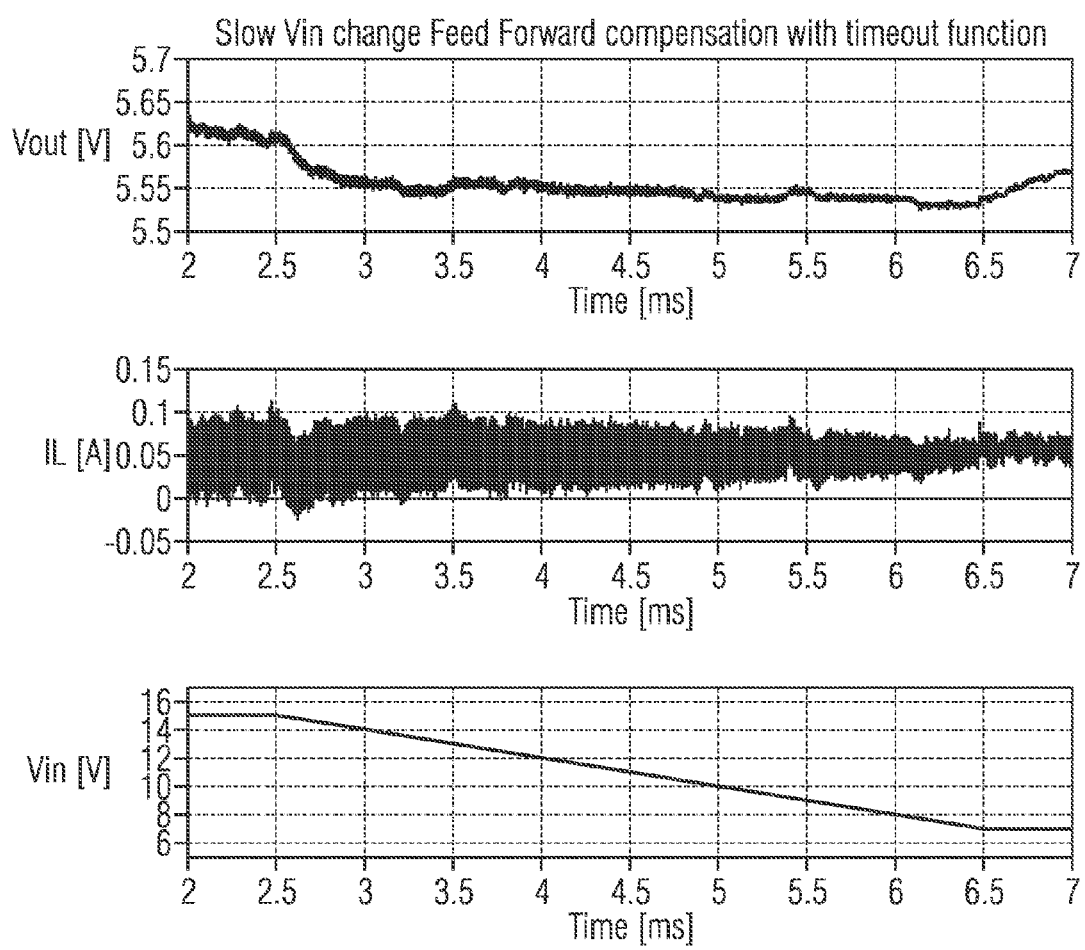

FIG. 9b shows the response of the SMPS using a time out function described in a feed forward controller 400 with a counter 414. In this case the output voltage shows a significant reduction in the ripple voltage. By updating the memory element 410 after each timeout period, ΔVin is kept low enough to avoid triggering feed forward correction to the control loop in the presence of a slowly varying input voltage. In some embodiments, the time out period is chosen to be closer to the system bandwidth, and the controller provides the compensation for the Vin variation.

Figure 10:
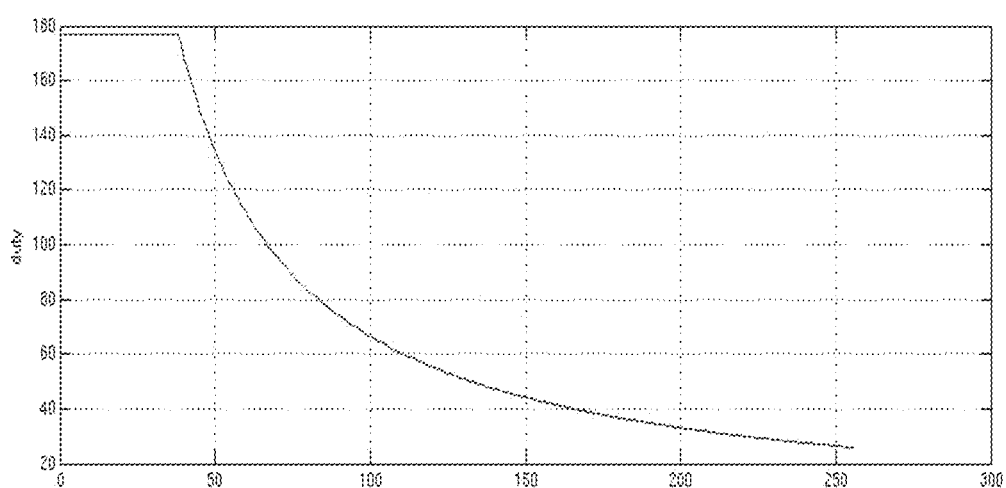
FIG. 10 illustrates a waveform diagram of a duty cycle and a time off period for an embodiment feed forward controller.
Figure 10:
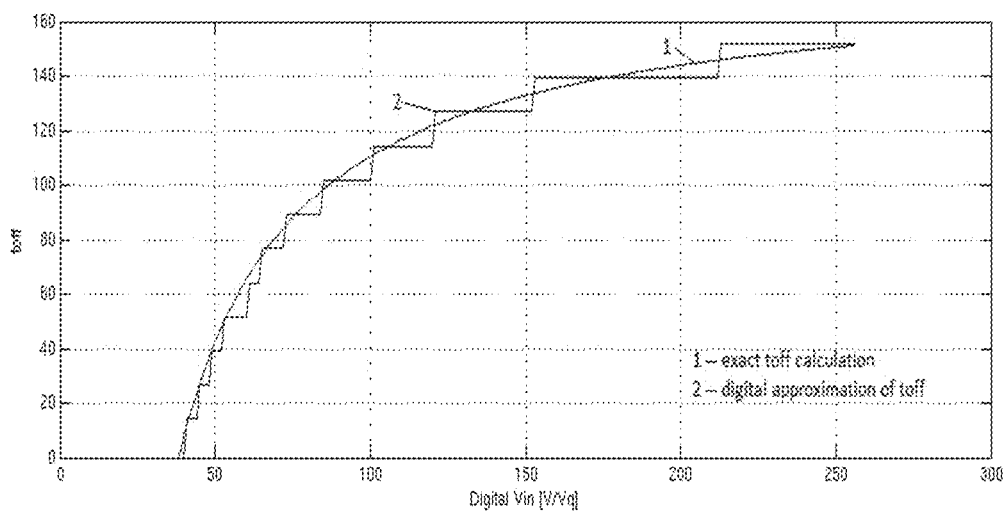

FIG. 10 illustrates the duty cycle and time off $t_{off}$ values for the embodiment feedback control loop 200 of a SMPS for different supply voltage inputs Vin. In the upper graph, the horizontal axis provides a digital value of Vin and the vertical axis shows the counter value of DPWM representing the duty cycle. The upper graph starts with maximum counter value of the DPWM indicating a 100% duty cycle and the counter value decreases as Vin increases. The counter value settles to a minimum duty cycle when the digital value of Vin is around 255. In the bottom graph, two waveforms are shown. The waveform labeled 1 represents the exact time off $t_{off}$ calculation and the waveform labeled 2 represents the digital estimation of $t_{off}$. The waveform shows that in some instances the digital approximation of the $t_{off}$ is higher than the exact $t_{off}$ and in some other instances it is lower than the exact $t_{off}$. In an embodiment, a higher value of digital approximation may cause undershoot of output voltage during a transition between pulse PFM mode and PWM mode. Accordingly, a lower value of digital approximation of $t_{off}$ may cause an overshoot during the transition between PFM mode and PWM mode. In another embodiment, if we calculate duty cycle based on $t_{on}$ time, a lower value of digital approximation of $t_{on}$ may cause an undershoot during the transition between PFM mode and PWM mode.

Figure 11:
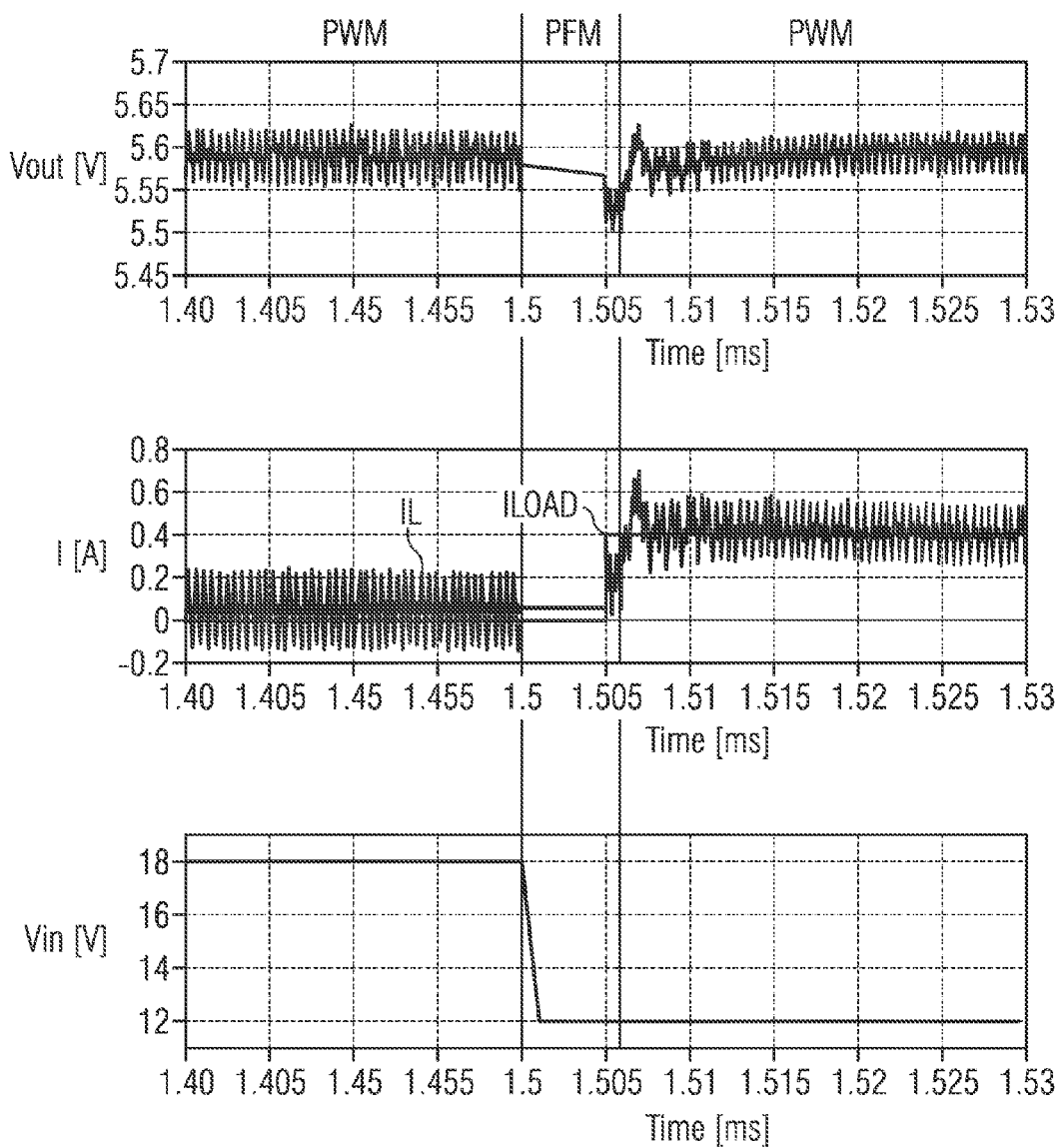
FIG. 11 illustrates a waveform diagram of various signals in a SMPS system during mode transition using an embodiment feed forward controller.

FIG. 11 illustrates the waveform of various signals in a simulation of the SMPS 300. The horizontal axis represents time and the vertical axis represents the voltage and current. The waveform labeled Vin represents the supply input voltage, the waveform labeled IL represents the inductor current, the waveform labeled ILOAD represents a load current and the waveform labeled Vout represents the output voltage of the simulated SMPS. The waveforms are described for the SMPS beginning in PWM mode then going to PFM mode and then going back to PWM mode. During the first PWM mode, which occurs between time 1.48 milliseconds to 1.5 milliseconds, the supply input voltage Vin is steady at 16 V, and PWM switching is observed in the inductor current IL and in the output voltage Vout. At time 1.5 milliseconds, the SMPS transitions to PFM mode and during that time, Vin drifts to 12 V. The inductor current IL is around zero at this time since there is no switching and output voltage Vout hovers around 5.55 V. This is close to the value of Vout, thus there is no need to charge up the output capacitor. The power stage is set in tri-state condition where the high side HS and low side LS switches are turned off. The output voltage ripple is observed due to the absence of switching. At time 1.505 milliseconds, the SMPS transitions from PFM mode to PWM mode and the output voltage recovers quickly with improved transient response. The transition from PFM mode to PWM mode is enabled because of an increase in the load current ILOAD. The duty cycle of the SMPS increases due to decrease in the supply voltage. It should be understood that the waveform diagrams of FIG. 11 illustrates one of many examples of the embodiment feed forward control systems.

Figure 12:
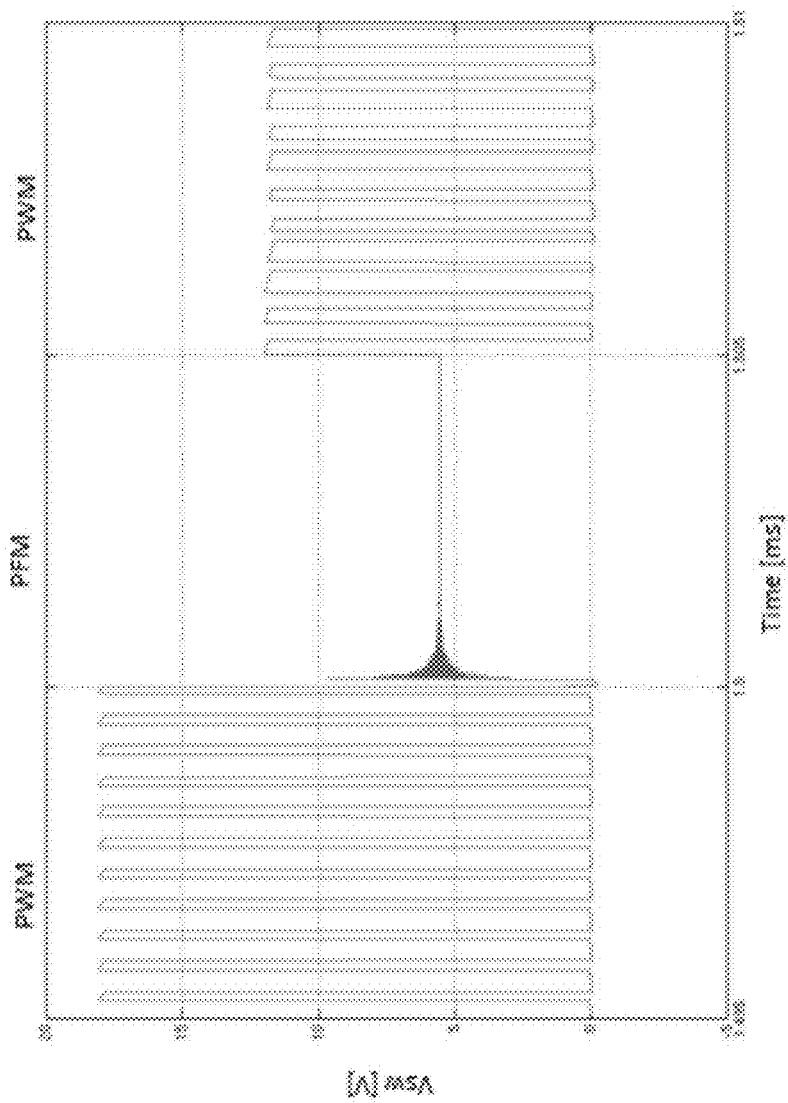
FIG. 12 illustrates a waveform diagram of an output switching node of a SMPS system during mode transition using an embodiment feed forward controller.

FIG. 12 illustrates the waveform of the switching node for the simulation of the SMPS shown in FIG. 11. The signal labeled Vsw represents the waveform observed at the switching node of the SMPS. In the first PWM period, the switching node switches between 16 V and a ground reference voltage. The switching node stays around the output voltage during the PFM mode because the power stage is in tri-state mode. When the mode transition takes place around 1.505 milliseconds, the switching node begins switching between 12 V and the ground reference voltage. The duty cycle in the second PWM mode is higher than in the first PWM mode in order to compensate for the lower supply voltage.

Figure 13:
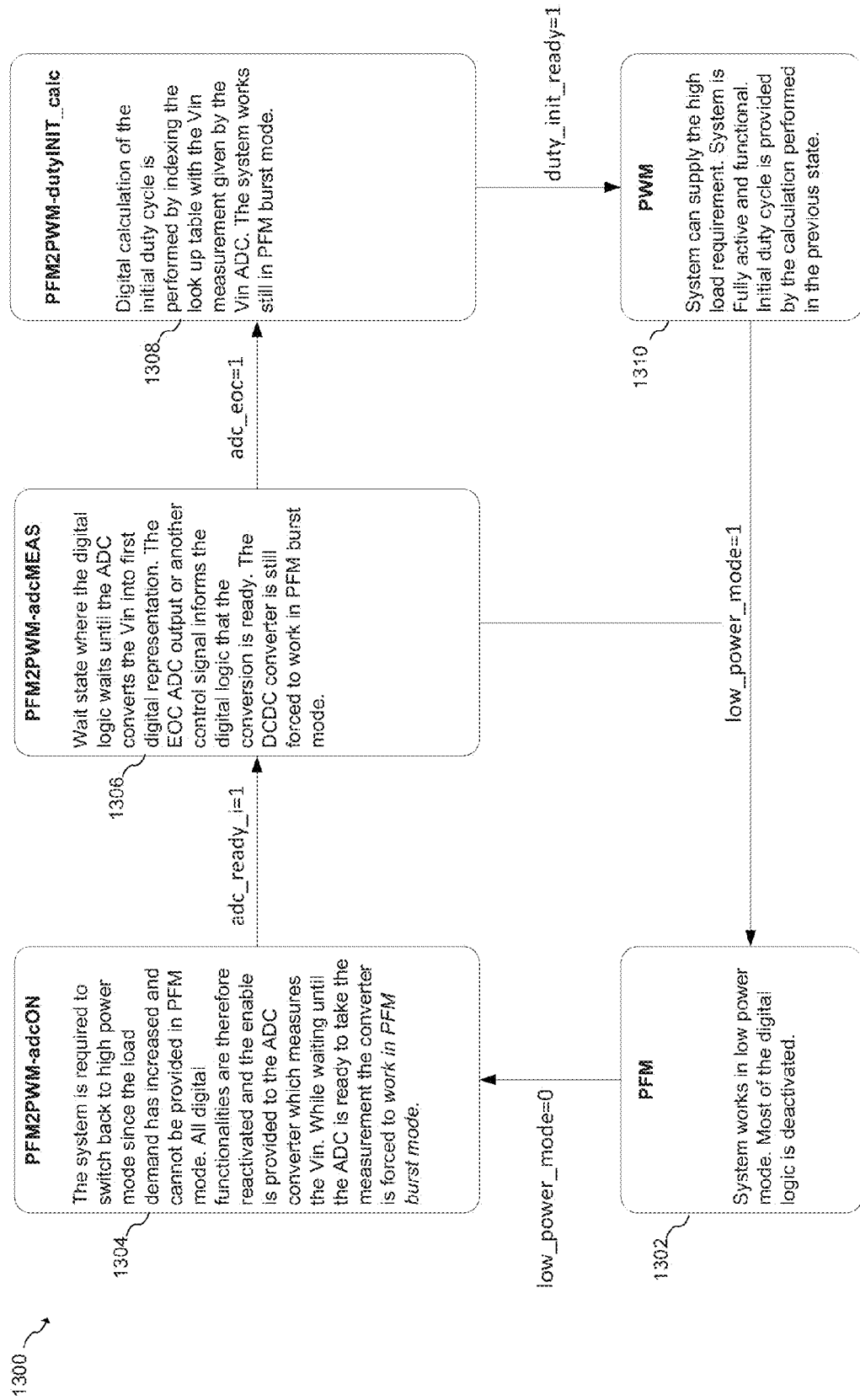
FIG. 13 illustrates a flow diagram of an embodiment feed forward controller.

FIG. 13 shows a flow diagram 1300 of an embodiment method for a mode transition from mode PFM to PWM mode. In step 1302, the SMPS is in the PFM mode and the system is in low power mode having most of its digital logic in sleep mode. The flow diagram moves to next step 1304 when the low_power_mode signal is low indicating a request for a beginning of the PWM mode. In step 1304, the system prepares to handle increased load power demand that cannot be handled in PFM mode. The system enables all digital functions from sleep mode and enables an analog to digital converter (ADC) to measure supply input voltage Vin. The flow diagram moves to step 1306 when the adc_ready signal is high. In step 1306, the system waits for the ADC to finish conversion of the Vin and the system still works in PFM burst mode to handle increased load requirements. The transition to next step 1308 happens when the adc_eoc signal goes high indicating that ADC conversion is complete. In step 1308, the calculation for the initial duty cycle is performed with a look up table based on measured Vin. The system still works in PFM burst mode. The flow diagram transitions to next step 1310 when the duty_init_ready signal is high indicating that the initial duty cycle is initialized to the integrator. In step 1310, the system goes to PWM mode using the initial duty cycle calculated in step 1308. The system stays in PWM mode until the low_power_mode signal is high indicating a request for mode transition to low power mode. The system repeats the cycle as described above.

In accordance with various embodiments, circuits or systems may be configured to perform particular operations or actions by virtue of having hardware, software, firmware, or a combination of them installed on the system that in operation causes or cause the system to perform the actions. One general aspect includes a method for controlling a switched-mode power supply (SMPS) that includes receiving a measurement of a supply voltage input of the SMPS, determining a change in the supply voltage input over time based on receiving the measurement, comparing the determined change in the supply voltage input with a predetermined threshold value, and applying a correction factor to an integrator within a feedback control loop of the SMPS based on the comparing.

In another embodiment, the method further includes measuring the supply voltage input of the SMPS and performing an analog to digital conversion (ADC) to find a measurement value The measured supply voltage input may be low pass filtered. In a further embodiment, determining the change in the supply voltage input includes differentiating the measurement to find a deviation value and comparing the deviation value with the predetermined threshold value, where the threshold value includes a first threshold value and a second threshold value.

The method may further include determining the correction factor by updating an accumulator value when a deviation value crosses the predetermined threshold value and continuing update for N consecutive switching cycles until the accumulator value reaches a zero value. The accumulator may be updated by adding the correction factor to the integrator when the accumulator value is non-zero. In some embodiments, the method further includes determining the correction factor by calculating a first value inversely proportional to a square of the supply voltage input. The first value may be multiplied by a second value proportional to a product of an output voltage of a SMPS and an oversampling OS factor that may be represented by a ratio of a clock frequency fck and a switching frequency fsw. In some embodiments, determining the correction factor includes using a look up table (LUT).

In an embodiment, determining the change includes sampling a first received measurement of the supply voltage input to form a stored value, comparing a second received measurement of the supply voltage input with the stored value, and sampling a third received measurement of the supply voltage input when a difference between the first received measurement and the second received measurement crosses the predetermined threshold value or when a predetermined time has elapsed since sampling the first received measurement.

In accordance with a further embodiment, a power supply system includes a power supply control circuit comprising an integrator; and a feed forward controller configured to receive a measurement of a supply voltage input, determine a change in the supply voltage input over time based on the received measurement, compare the determined change in the supply voltage input with a predetermined threshold value, determine a correction factor based on the comparing, and apply the correction factor to the integrator.

In some embodiments, the system further includes the feed forward controller that includes a memory element configured to store a received measurement of the supply voltage input; a subtraction circuit configured to determine a difference between the stored measurement of the supply voltage input and a currently received measurement of the supply voltage input, a comparator configured to compare the determined change in the supply voltage input to a predetermined threshold value. The feed forward controller is further configured to apply the correction factor to the integrator when an output of the comparator indicates that the determined difference exceeds the predetermined threshold value.

The system may further include an analog to digital converter (ADC) having an output coupled to an input of the memory element, which may be configured to store the received measurement when the comparator indicates that the determined difference exceeds the predetermined threshold value. In further embodiment, the system includes a time-out circuit coupled to the memory element. The time-out circuit configured to cause the memory element to store the received measurement when a predetermined time is elapsed since a previous time the memory stored the received measurement.

In accordance with another embodiment, a method for controlling a switched-mode power supply (SMPS) includes measuring a supply voltage input of the SMPS in a pulse frequency modulation (PFM) mode, generating a first value inversely proportional of the measured supply voltage input, calculating an initial duty cycle based on the first value; and applying the initial duty cycle to a control loop integrator of the SMPS when the SMPS transitions from the PFM mode to a pulse width modulation (PWM) mode.

In various embodiments, the method further includes generating the first value by determining the first value based on an output voltage of the SMPS. Generating the first value may include determining the first value based on a maximum count value for a digital pulse width modulation (DPWM) counter. In another embodiment, generating the first value includes using a lookup table to determine a lookup table output value based on the measured supply voltage input, where the lookup table output value is inversely proportional to the measured supply voltage input; and multiplying the lookup table output value by a second value proportional to an output voltage of the SMPS and by a third value proportional to a maximum count value for a digital pulse width modulation (DPWM) counter.

In accordance with a further embodiment, a switched-mode power supply includes an integrator coupled to a control loop of the switched-mode power supply, and a duty cycle calculation circuit configured to calculate an initial duty cycle based on an input voltage of the switched-mode power supply when the switched-mode power supply operates in a pulse frequency modulation (PFM) mode, and initialize the integrator with the calculated initial duty cycle when the switched-mode power supply transitions from the PFM mode to a pulse width modulation (PWM) mode.

The switched-mode power supply system may further include a duty cycle calculation circuit having a first look up table to generate a first value inversely proportional to the input voltage of the switched-mode power supply in the PFM mode, a first multiplier to multiply a first register value with a second register value and generate a first multiplier value, and a second multiplier to multiply the first multiplier value with the first value to generate the initial duty cycle in the PFM mode.

In some embodiments, the first register value has a maximum count value of a digital pulse width modulation (DPWM) counter and the second register value represents an output voltage of the switched-mode power supply. In an embodiment, the switched-mode power supply has the duty cycle calculation circuit further configured to, in the PWM mode, determine a change in the input voltage of the switched-mode power supply voltage with respect to time in the PWM mode, determine a correction factor based on determined change and apply the correction factor to the integrator in the PWM mode. The duty cycle calculation circuit may have a second lookup table to generate a third value inversely proportional to a square of the input voltage of the switched-mode power supply in the PWM mode, and the duty cycle calculation circuit may be further configured to use the second multiplier to multiply the first multiplier value with the third value to generate the correction factor in the PWM mode.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

It is therefore intended that the appended claims encompass any such modifications or embodiments.

What is claimed is:

1. A method for controlling a switched-mode power supply (SMPS), comprising:
 receiving a measurement of a supply voltage input of the SMPS;
 determining a change in the supply voltage input over time based on receiving the measurement;
 comparing the determined change in the supply voltage input with a predetermined threshold value; and
 applying a correction factor to an integrator within a feedback control loop of the SMPS based on the comparing.

2. The method of claim 1, further comprising:
 measuring the supply voltage input of the SMPS; and
 performing an analog to digital conversion (ADC) to find a measurement value.

3. The method of claim 1, further comprising a low pass filtering of the measured supply voltage input.

4. The method of claim 1, wherein determining the change in the supply voltage input comprises:
 differentiating the measurement to find a deviation value; and
 comparing the deviation value with the predetermined threshold value.

5. The method of claim 4, wherein the predetermined threshold value comprises a first threshold value and a second threshold value.

6. The method of claim 1, wherein determining the correction factor comprises:
 updating an accumulator value when a deviation value crosses the predetermined threshold value; and
 continuing update for N consecutive switching cycles until the accumulator value reaches a zero value.

7. The method of claim 6, wherein updating the accumulator value comprises adding the correction factor to the integrator when the accumulator value is non-zero.

8. The method of claim 1, further comprising determining the correction factor, determining the correction factor comprising calculating a first value inversely proportional to a square of the supply voltage input.

9. The method of claim 8, further comprising multiplying the first value by a second value proportional to a product of an output voltage of a SMPS and an oversampling OS factor.

10. The method of claim 9, wherein the oversampling OS factor is represented by a ratio of a clock frequency $f_{ck}$ and a switching frequency $f_{sw}$.

11. The method of claim 9, determining the correction factor comprises using a look up table (LUT).

12. The method of claim 1, wherein determining the change comprises:
 sampling a first received measurement of the supply voltage input to form a stored value;
 comparing a second received measurement of the supply voltage input with the stored value; and
 sampling a third received measurement of the supply voltage input when a difference between the first received measurement and the second received measurement crosses the predetermined threshold value or when a predetermined time has elapsed since sampling the first received measurement.

13. A power supply system comprising:
 a power supply control circuit comprising an integrator; and
 a feed forward controller configured to
  receive a measurement of a supply voltage input,
  determine a change in the supply voltage input over time based on the received measurement,
  compare the determined change in the supply voltage input with a predetermined threshold value,
  determine a correction factor based on the comparing, and
  apply the correction factor to the integrator.

14. The system of claim 13, wherein the feed forward controller comprises:
 a memory element configured to store a received measurement of the supply voltage input;
 a subtraction circuit configured to determine a difference between the stored measurement of the supply voltage input and a currently received measurement of the supply voltage input; and
 a comparator configured to compare the determined change in the supply voltage input to a predetermined threshold value, wherein the feed forward controller is further configured to apply the correction factor to the integrator when an output of the comparator indicates that the determined difference exceeds the predetermined threshold value.

15. The system of claim 14, further comprising an analog to digital converter (ADC) having an output coupled to an input of the memory element.

16. The system of claim 14, wherein the memory element is configured to store the received measurement when the comparator indicates that the determined difference exceeds the predetermined threshold value.

17. The system of claim 14, further comprising a time-out circuit coupled to the memory element, the time-out circuit configured to cause the memory element to store the received measurement when a predetermined time is elapsed since a previous time the memory element stored the received measurement.

18. A method for controlling a switched-mode power supply (SMPS), comprising:
 measuring a supply voltage input of the SMPS in a pulse frequency modulation (PFM) mode;
 generating a first value inversely proportional of the measured supply voltage input;
 calculating an initial duty cycle based on the first value; and
 applying the initial duty cycle to a control loop integrator of the SMPS when the SMPS transitions from the PFM mode to a pulse width modulation (PWM) mode.

19. The method of claim 18, wherein generating the first value further comprises determining the first value based on an output voltage of the SMPS.

20. The method of claim 19, wherein generating the first value further comprises determining the first value based on a maximum count value for a digital pulse width modulation (DPWM) counter.

21. The method of claim 19, wherein generating the first value comprises:
 using a lookup table to determine a lookup table output value based on the measured supply voltage input, wherein the lookup table output value is inversely proportional to the measured supply voltage input; and
 multiplying the lookup table output value by a second value proportional to an output voltage of the SMPS and by a third value proportional to a maximum count value for a digital pulse width modulation (DPWM) counter.

22. A switched-mode power supply comprising:
 an integrator coupled to a control loop of the switched-mode power supply; and a duty cycle calculation circuit configured to
calculate an initial duty cycle based on an input voltage of the switched-mode power supply when the switched-mode power supply operates in a pulse frequency modulation (PFM) mode, and
initialize the integrator with the calculated initial duty cycle when the switched-mode power supply transitions from the PFM mode to a pulse width modulation (PWM) mode.

23. The switched-mode power supply of claim 22, wherein the a duty cycle calculation circuit comprises:
a first look up table to generate a first value inversely proportional to the input voltage of the switched-mode power supply in the PFM mode;
a first multiplier to multiply a first register value with a second register value and generate a first multiplier value; and
a second multiplier to multiply the first multiplier value with the first value to generate the initial duty cycle in the PFM mode.

24. The switched-mode power supply of claim 23, wherein the first register value is a maximum count value of a digital pulse width modulation (DPWM) counter and the second register value represents an output voltage of the switched-mode power supply.

25. The switched-mode power supply of claim 23, wherein the duty cycle calculation circuit is further configured to:
in the PWM mode, determine a change in the input voltage of the switched-mode power supply voltage with respect to time in the PWM mode;
in the PWM mode, determine a correction factor based on determined change; and
apply the correction factor to the integrator in the PWM mode.

26. The switched-mode power supply of claim 25, wherein:
the duty cycle calculation circuit further comprises a second lookup table to generate a third value inversely proportional to a square of the input voltage of the switched-mode power supply in the PWM mode; and
the duty cycle calculation circuit is further configured to use the second multiplier to multiply the first multiplier value with the third value to generate the correction factor in the PWM mode.

* * * * *